United States Patent
Pappas

(10) Patent No.: US 10,153,991 B2
(45) Date of Patent: Dec. 11, 2018

(54) USE BASED SCALABLE INSTANT VOICE COMMUNICATION

(71) Applicant: Cloud9 Technologies, LLC, New York, NY (US)

(72) Inventor: Andrew Pappas, Hicksville, NY (US)

( * ) Notice: Subject to any disclaimer, the term of this patent is extended or adjusted under 35 U.S.C. 154(b) by 282 days.

(21) Appl. No.: 15/258,017

(22) Filed: Sep. 7, 2016

(65) Prior Publication Data

US 2017/0201470 A1  Jul. 13, 2017

Related U.S. Application Data

(60) Provisional application No. 62/277,464, filed on Jan. 11, 2016.

(51) Int. Cl.
*H04L 12/26* (2006.01)
*H04L 12/861* (2013.01)
*H04M 3/30* (2006.01)

(52) U.S. Cl.
CPC .......... *H04L 49/9005* (2013.01); *H04M 3/30* (2013.01)

(58) Field of Classification Search
CPC ......... H04L 47/32; H04L 47/50; H04L 47/76; H04L 65/00
See application file for complete search history.

(56) References Cited

U.S. PATENT DOCUMENTS

| | | | | |
|---|---|---|---|---|
| 7,809,388 B1 * | 10/2010 | Othmer | ............... | H04M 1/6505 455/426.1 |
| 2005/0107091 A1 * | 5/2005 | Vannithamby | ........ | H04W 28/08 455/453 |
| 2005/0124366 A1 * | 6/2005 | Hassan | ................... | H04W 4/06 455/518 |

* cited by examiner

*Primary Examiner* — Kevin C. Harper

(74) *Attorney, Agent, or Firm* — Richard M. Lehrer; Fisher Broyles LLP

(57) ABSTRACT

Systems and methods are provided for limiting the number of persistent voice connections for a user and for configuring dynamic connections to appear from the user's perspective as if they were persistent connections. When the user initiates a call over a dynamic connection the user's voice is stored until the connection is established at which time the user's voice will continue to be stored and will also be transmitted over the connection until the voice being stored and the voice being transmitted become the same.

21 Claims, 7 Drawing Sheets

USE BASED SCALABLE INSTANT VOICE COMMUNICATION

CROSS REFERENCE TO RELATED APPLICATIONS

This application claims the benefit of the filing date of U.S. provisional patent application No. 62/277,464 entitled "Use Based Scalable Instant Voice Communication", which was filed on Jan. 11, 2016, by the same patentee of this application and which shares the same inventor as this application. That provisional application is hereby incorporated by reference as if fully set forth herein.

FIELD OF THE INVENTION

The technology of the present application relates generally to network based communications, and more specifically but not exclusively to managing the number of persistent virtual circuits for a user with multiple private line connections.

BACKGROUND OF THE INVENTION

Traditionally voice calls are made by a user placing their phone in an off-hook state, dialing a number manually or automatically using a pre-programmed number, waiting for the system to check the number, route the call and ring the distant end who will then place their phone in an off-hook state and begin speaking. An alternative is to use a dedicated line or resource between two users, sometimes called a private line, which is always connected. With private lines, connections are established before users need them. There is no dialing with a private line, so conversations can begin much faster. However, conventional private lines are not cost effective because telecom providers have to connect users who may not be in the same building state or country with a circuit that cannot be re-used for any other purpose. Additionally, conventional private line circuits often take weeks or months to provision and are expensive. These cost and provision restraints often result in users only being able to maintain a small number of conventional private connection circuits.

An alternate way to create dedicated peer to peer connections (FIG. 1) is over a private or public packet switched local area network (LAN) or wide area network (WAN). Packet switched private lines are more cost effective and faster to setup since they do not require dedicated lines and patching by telecom providers. Thus, more private lines can be created relatively quickly but they will still lock up system resources and available bandwidth as they must always be connected.

Users in some industries may have 500 or more contacts with whom they would like to have private line connections. However, a user can typically only afford to maintain a constant connection with a small percentage of those contacts. This is because, as stated above, each constant connection places a burden on overall system resources. However, a user typically only speaks with a small percentage of his/her contacts over a given period of time. During that same period of time the user may not speak to some contacts at all and at other times the connections remains idle and could be put to better use. Further, over time, it is not unusual for a particular private line to be used infrequently or not at all. This can result from the user of the private line leaving the firm and taking the counterparty relationship with them, or possibly the user's need was based on a short-term business opportunity/issue, or maybe the counterparty may have changed their location without anybody notifying the firm to order a circuit disconnect. In most cases firms do not actively monitor the activity of their private voice circuits, and users of private lines are not incentivized to notify managers of circuits that are no longer required. The effect is that telecom costs will creep higher over time as the inventory of private voice circuits are added and users continue to request additional connections and/or, in the case of packet switched connections, the available bandwidth of the firm and thus the efficiency of the non-dedicated communications will degrade over time.

It would be advantageous to provision dynamic connections which the user detects as persistent connections. It would also be advantageous to provision the most active connections as persistent connections and provision other connections as dynamic connections.

BRIEF SUMMARY OF THE INVENTION

Many advantages will be determined and are attained by one or more embodiments of the technology, which in a broad sense provides systems and methods for managing a number of persistent connections attributed to a user while managing other connections as dynamic connections which appear to the user as persistent connections or sufficiently similar to persistent connections that the differences are immaterial.

One or more embodiments of the technology provides a system for managing persistent voice channels. The system includes multiple persistent voice channels assigned to a user device. The system also includes a monitor in communication with the persistent voice channels. The monitor is configured to determine a set of the persistent voice channels that is utilized more often than another set of the persistent voice channels. The system also includes a voice channel provisioning module which is configured to convert at least one persistent voice channel from the another set of persistent voice channels into a dynamically provisioned voice channel.

One or more embodiments of the technology provides a method for limiting an availability of persistent voice connections for a user. The method includes a server provisioning multiple persistent voice channels for a user device. The method also includes a monitor determining a set of the persistent voice channels that is utilized more often than another set of persistent voice channels. The sever converts at least one persistent voice channel from the another set of persistent voice channels into a dynamically provisioned voice channel.

One or more embodiments of the technology provides a method for creating a dynamically provisioned voice channel. The method includes initiating, with a user device, a voice call and in response to initiating the call the user device records voice received by the user device from the user to a storage module. The storage module is associated with the user device. The user device transmits the recorded voice from the storage module onto the voice channel in response to the voice channel being established (either automatically or by the contact at the other end accepting the call). The user device continues to record the user's voice onto the storage module and transmit the recorded voice from the storage module onto the voice channel until the voice being transmitted catches up to the voice being recorded (i.e. the voice is being transmitted as soon as it is being recorded).

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with the accompanying drawings, in which like reference characters refer to like parts throughout, and in which.

Figure 1:
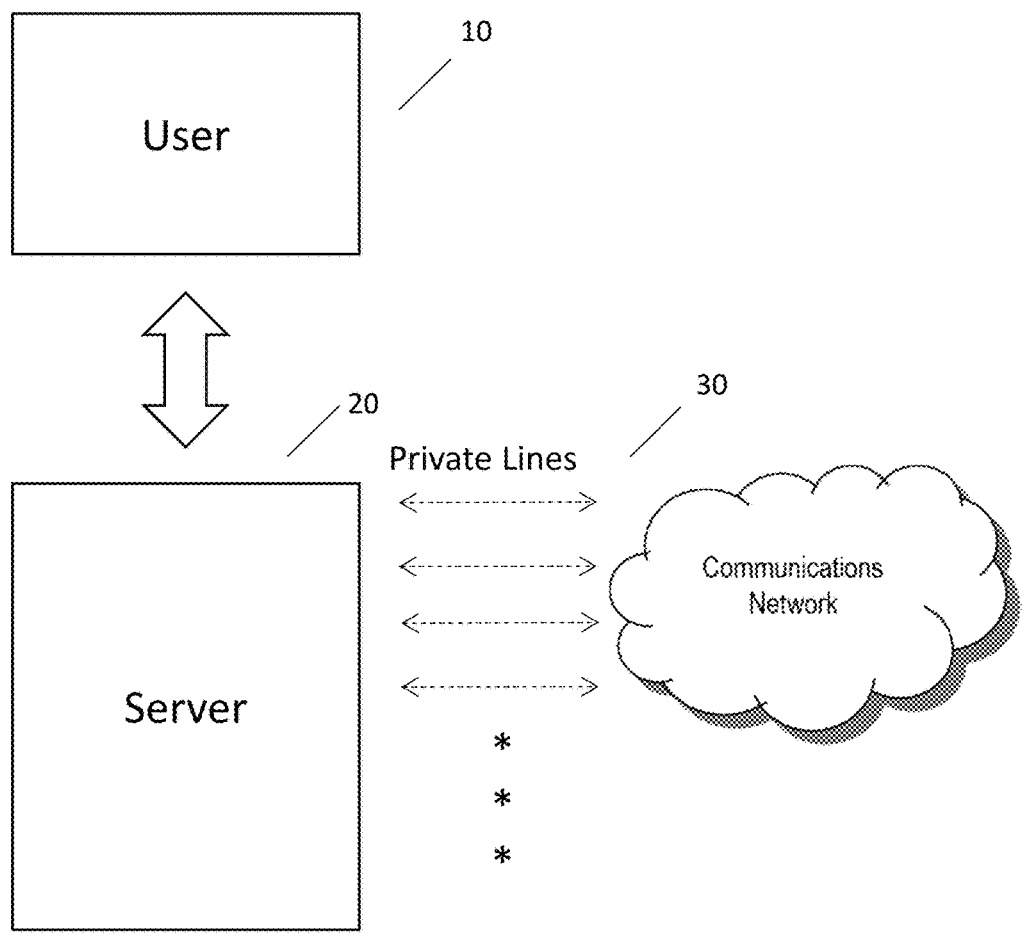
FIG. 1 provides a block diagram illustrating a conventional system with a user with multiple packet switched persistent connections provisioned.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the figures in detail wherein like reference numerals identify like elements throughout the various figures, there is illustrated in FIGS. 1-4 systems and methods for providing a number of persistent voice connections to a user and for providing additional dynamic connections to the user, which appear to the user as persistent connections or sufficiently similar to persistent connections that the differences are immaterial to the user. The following description will be limited to the financial industry and in particular trading desks at financial institutions. However, those skilled in the art will recognize that the system could be employed by anyone. Additionally, the figures and the description may be limited to a single user with a single server but the technology may be employed with more than one user and more than one server. For purposes of the disclosure, the terms channel, line and circuit may be used interchangeably unless specifically defined for a particular description. For purposed of the disclosure, a user device may include a phone, a computer running a software phone, a phone connected to a computer or any other user terminal that is capable of communicating voice over a digital line. Additionally, for purposes of the disclosure, the terms persistent and private may be used interchangeably.

Discussion of an embodiment, one or more embodiments, an aspect, one or more aspects, a feature, one or more features, or a configuration or one or more configurations is intended to be inclusive of both the singular and the plural depending upon which provides the broadest scope without running afoul of the existing art and any such statement is in no way intended to be limiting in nature. Technology described in relation to one or more of these terms is not necessarily limited to use in that particular embodiment, aspect, feature or configuration and may be employed with other embodiments, aspects, features and/or configurations where appropriate.

While not illustrated, each server and user device in the system will include, among others, common elements. These are conventional elements and thus their operation and interconnections will not be further discussed herein. Those of ordinary skill in the art are deemed to understand how elements such as a processor, memory, storage, input/output ("I/O") interface, communications interface and clock are electrically connected and how they send and/or receive messages via a bus. While these elements are not illustrated in the block diagrams, those skilled in the art will recognize that the user device and the server each includes, among others, these elements and that the interaction between two or more of these elements is required to perform the functions of the disclosed technology.

Since a user with hundreds or thousands of contacts typically will not communicate with all of the contacts at the same time or even communicate with a large percentage of those contacts on a regular basis, it is a waste of network resources to establish a persistent voice channel between that user and every contact that the user has. Instead, it is more efficient and more logical to allow the user to maintain a limited number of persistent private line connections and the remaining connections can be converted to or configured as dynamic communication channels which will be perceived by the user as persistent voice channels or perceived as sufficiently close to be deemed persistent voice channels. A persistent channel maintains a communication path between end points such that if a user wants to speak to a person at the other end point he/she only needs to push a button (or select the communication channel via some other simple method) and start talking. The user can speak immediately without any perceivable clipping of the speech at the distant end.

Figure 2:
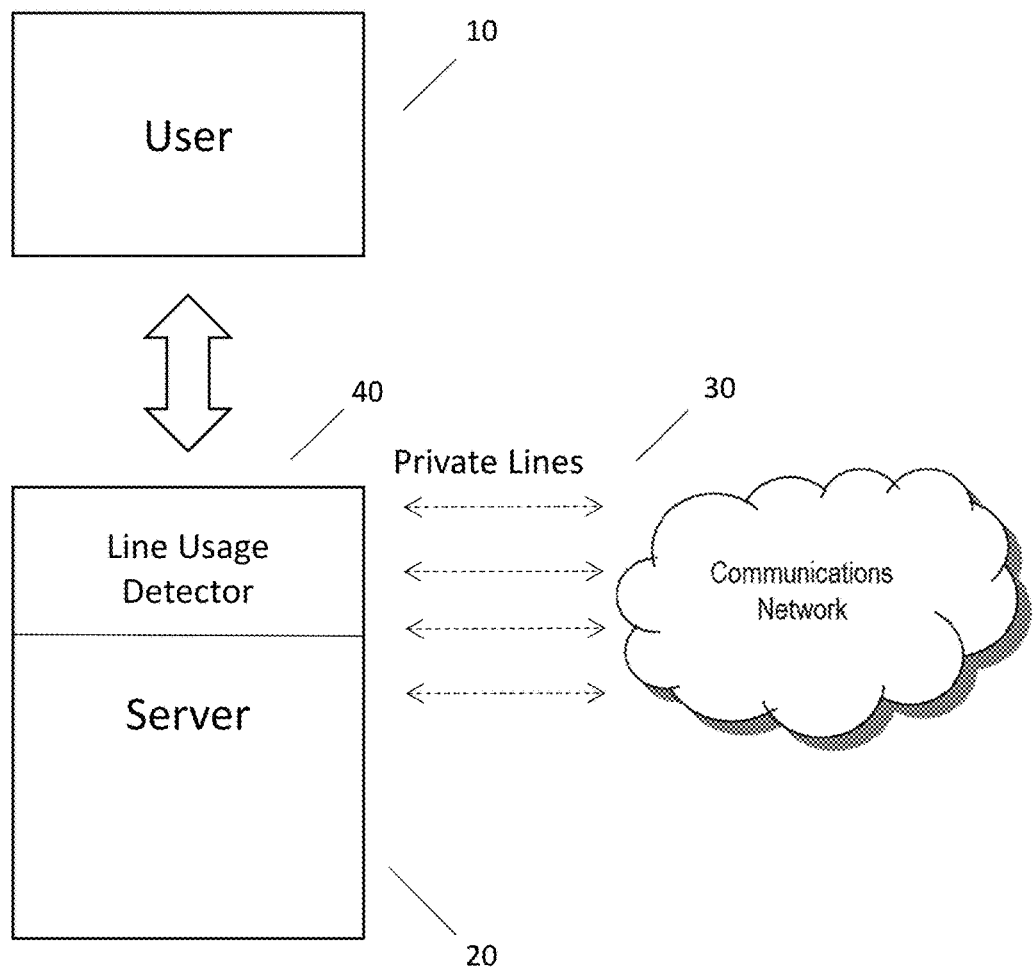
FIG. 2 illustrates the exemplary system of FIG. 1 wherein the users has a limited number of active persistent connections in accordance with the technology of the disclosure.
Figure 3:
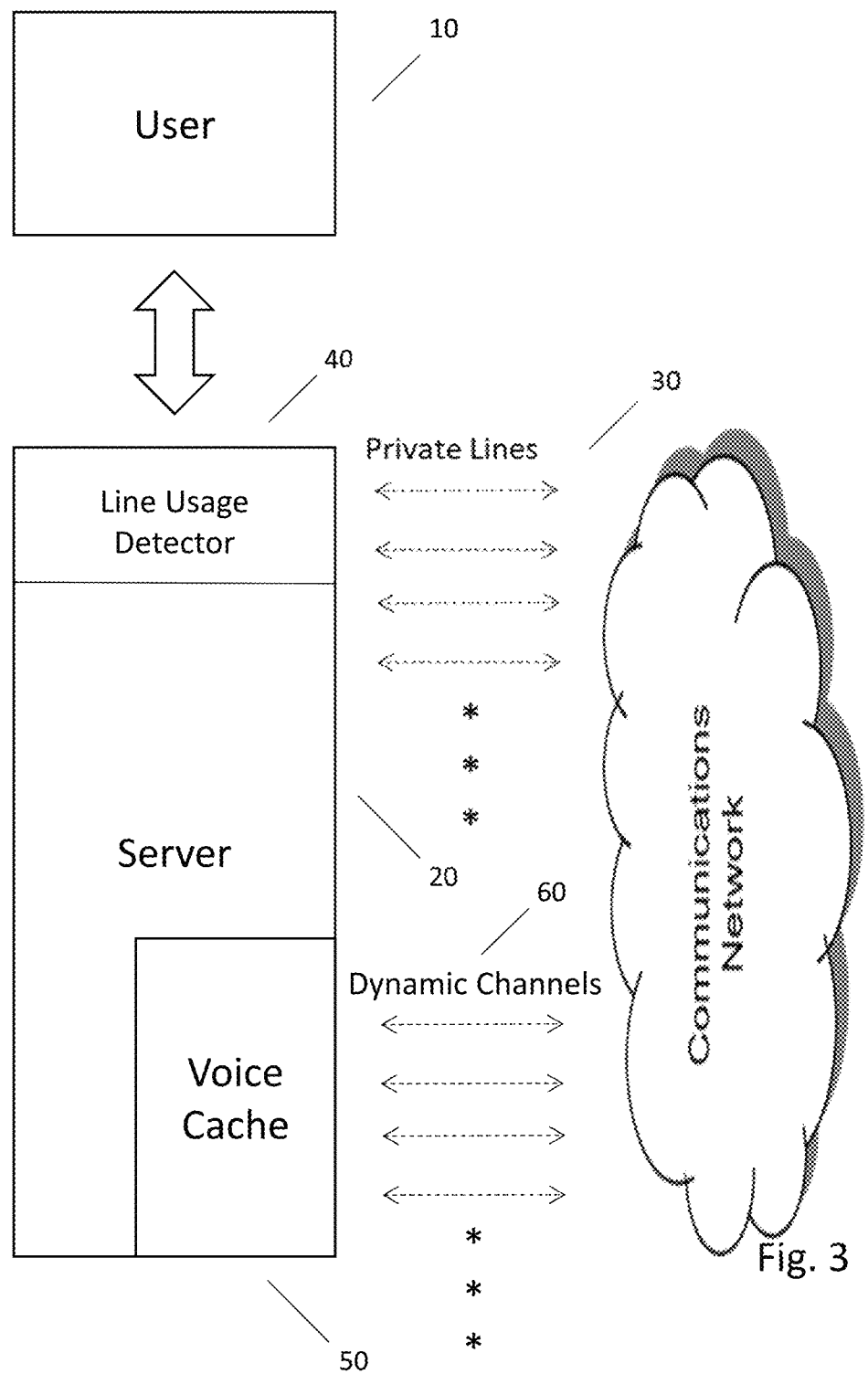
FIG. 3 illustrates the exemplary system of FIG. 2 configured for generating dynamic connections for the user which appear to the user as persistent connections in accordance with the technology of the disclosure.

As illustrated in FIG. 2, the number of persistent connections 30 that are assigned to a particular user 10 is a design choice as some users 10 will require more than others and some users 10 may be entitled to more channels 30 based on their needs and/or status within the firm. Alternatively, or additionally, the number of active connections 30 may be determined/limited by available system resources. In order to limit the number of persistent channels available to a particular user the system will monitor channel status 40 for all communication channels that are requested as persistent communication channels 30. This monitoring 40 may include detecting one or more types of interaction with the system and employing that interaction data to determine the most used channels 30. As illustrated in FIG. 3, those channels that are the most utilized may be configured as persistent channels 30 and those that are used less often may be configured as dynamic channels 60 as will be discussed further below.

The type of interaction that will determine the channel type may include information such as one or more of the following: number of times the user and/or the far end engage the channel, the length of time that the channel is in use either by the user and/or by a far end contact. The determination may be a running determination and/or it may be based on a certain time period. For example, there may be certain channels that get used more during the hours of 8 am to 8 pm and other channels that get user more often from 8 pm to 8 am and/or certain channels that get user more often on certain days of the week than others. Because of the relative ease of setting up a persistent channel over a packet switch network vs. the public switched telephone network (PSTN), in one or more embodiments, the selection of which channels are configured as persistent may be modified for different time periods to fit the needs of the user.

Figure 4:
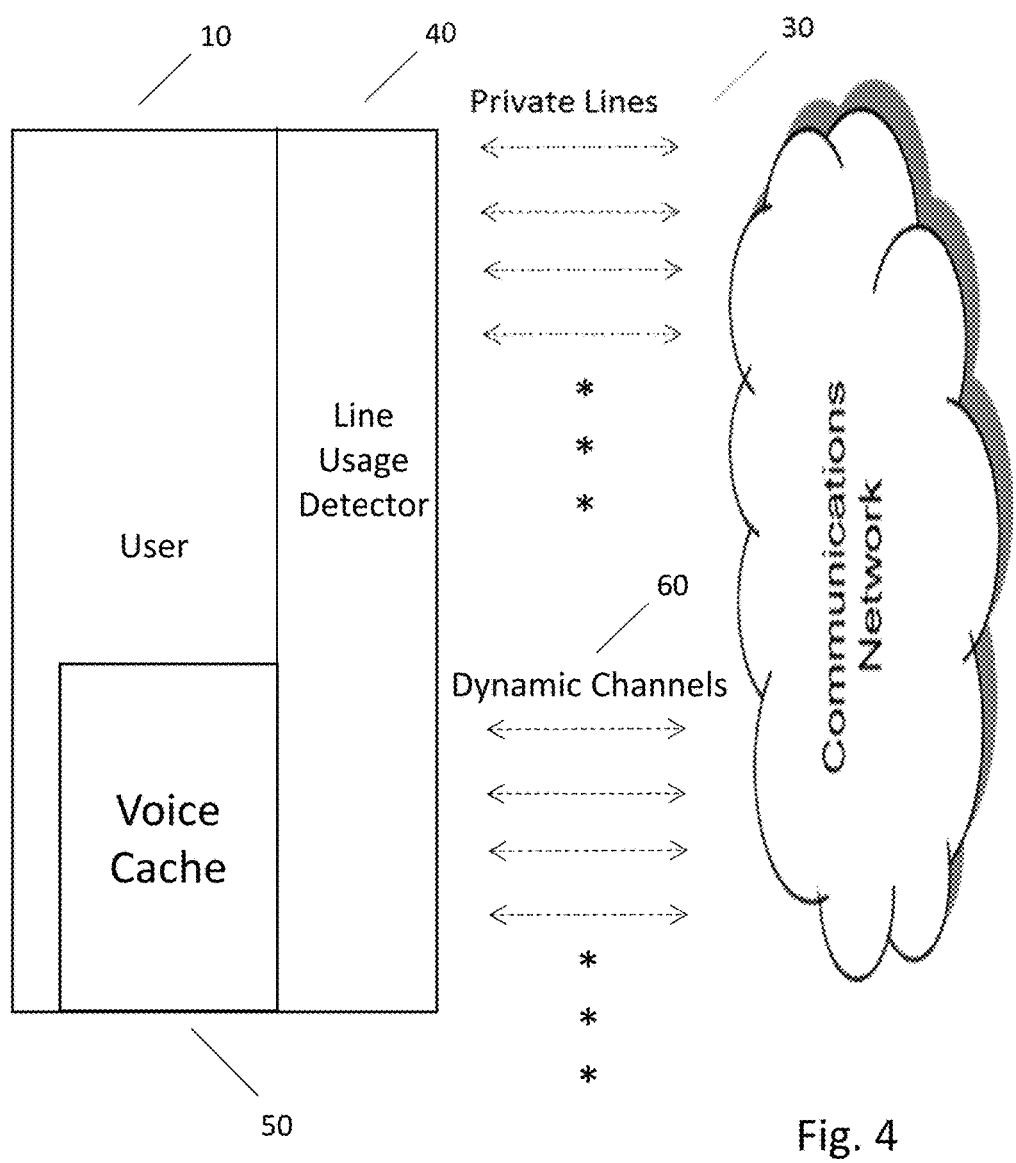
FIG. 4 illustrates an alternate embodiment of the system of the system of FIG. 3.

As illustrated by FIGS. 2 and 3, monitoring of the voice channels may be performed by line usage detector software and/or hardware 40 on a server 20 located at a customer premise, and/or it may be monitored by line usage detector software and/or hardware 40 on a server 20 located within the network 70. Alternatively, or additionally, the monitoring can also be performed by line usage detector software and/or hardware 40 located on the phone/client device 10 (FIG. 4). The monitoring may be performed by the same server 20 that configures the various voice channels 30/60 and/or it may be performed by a different device which instructs or sends messages to the device that provisions the various communications channels 30/60 for each user.

For those contacts that do not qualify for a persistent voice channel (as determined by the system administrator and/or by available system resources), the system may still provide a service to the user, which from the user's perspective will appear to operate as a persistent voice channel or at least be sufficiently similar that the difference is negligible. As illustrated in FIG. 3, the server 20 that connects the user 10 to the communications network 70 may include a voice cache 50 or some other type of conventional storage (collectively and/or individually a storage module). When a user 10 initiates a communication with a contact (100, FIG. 5), via a button press or speech detection or some other similar initiation technique, the voice cache 50 begins to record the user's speech (110, FIG. 5) and simultaneously or substantially simultaneously establishes a dynamic voice connection 60 with the contact. The voice connection 60 may be via any type and protocol or service, for example a plain old telephone service ("POTS") line, speed dial, voice over Internet Protocol ("VoIP"), public switched telephone network ("PSTN"), private network, etc. Those skilled in the art will recognize that the storage for voice may be located within the server 20, within the user's device 10 (FIG. 4), within a network server or within an adjunct to any of these devices.

Figure 5:
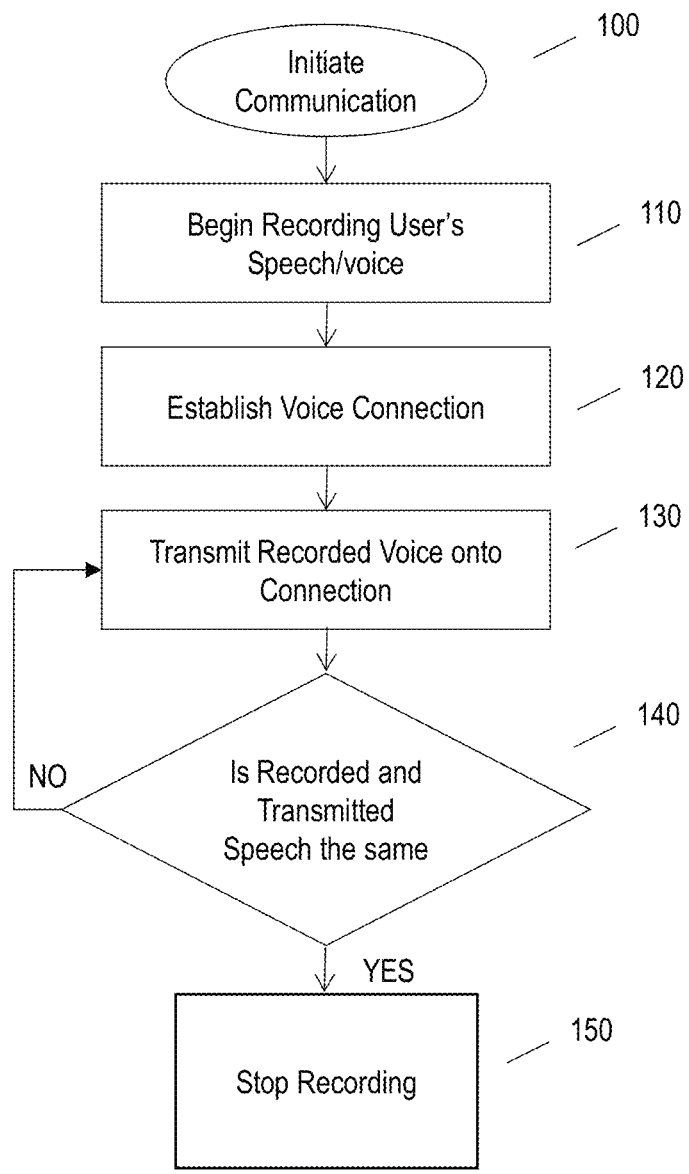
FIG. 5 provides a flow chart of an exemplary method creating a dynamic voice channel in accordance with the technology of the disclosure.

As illustrated in FIG. 5, once the call is established 120, either automatically or the contact at the distant end answers an incoming notification, the recorded audio will be played onto the channel in real-time 130 to the contact and the user's voice will continue to be recorded until such time that the recorded speech catches up to the real time conversation 140 (usually within a matter of milliseconds although not required to be so limited). In this way the user originating the call does not have to wait for the call to be established to communicate with the distant end contact. The distant end contact will hear the user's audio as soon as the connection is made, or as soon as the call is answered, depending on the call implementation. It does not matter how long it takes to establish the connection, the user's speech will be in storage, including storage space where the voice can be retrieved and resent even in the event of system failure.

The user initiating the call can be notified that the connection is established right away or after the speech previously stored has been completely played out to the distant end. It is desirable, but not required to know when the distant end system has established a call and is ready for audio reception. The information can be sent via metadata through the call signaling path or through the audio media path directly by using a custom real-time Transport Protocol (RTP) extension header.

Figure 6:
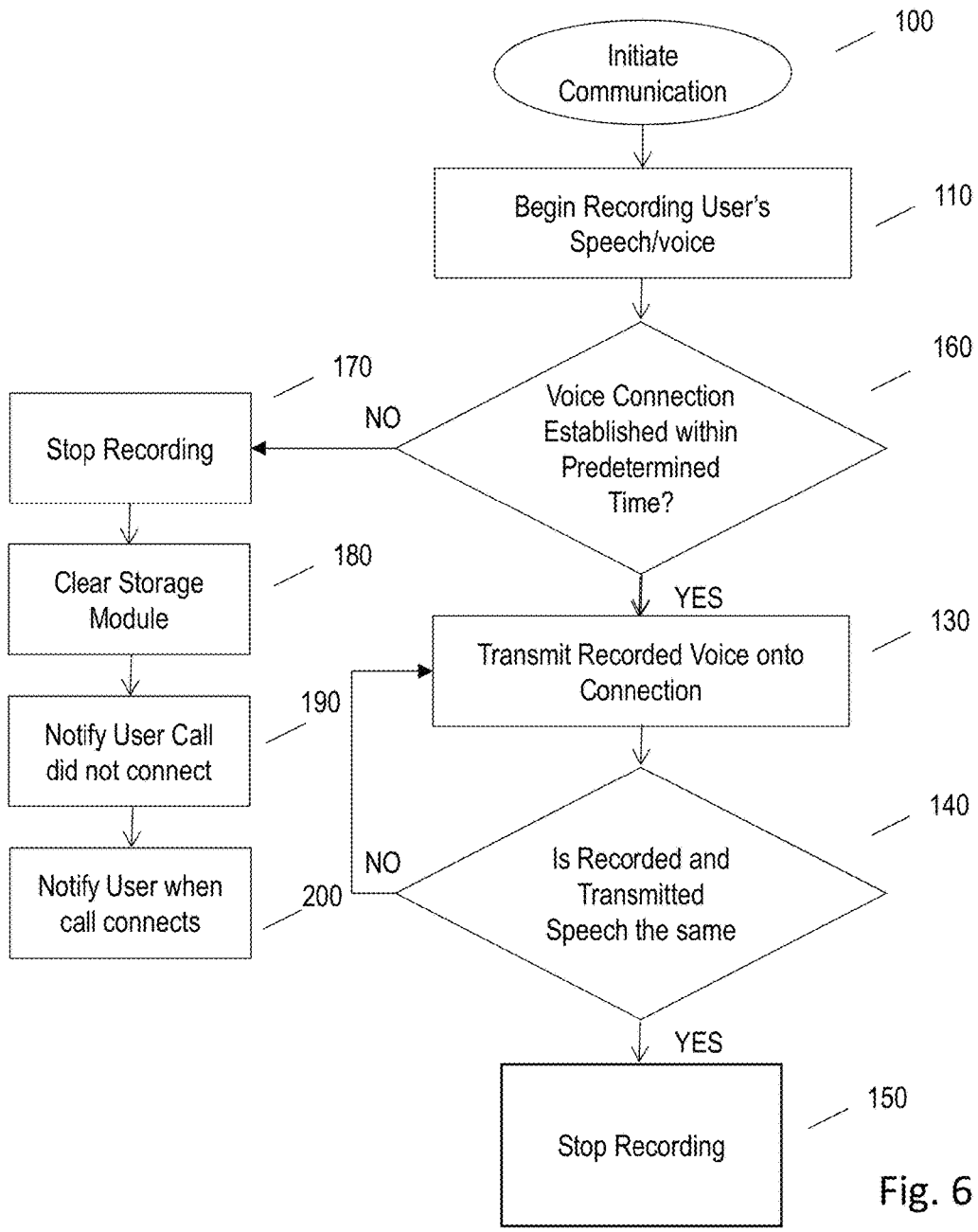
FIG. 6 provides a flow chart of another exemplary method creating a dynamic voice channel in accordance with the technology of the disclosure; and, FIG. 7 provides a flow chart of yet another exemplary method creating a dynamic voice channel in accordance with the technology of the disclosure.
Figure 7:
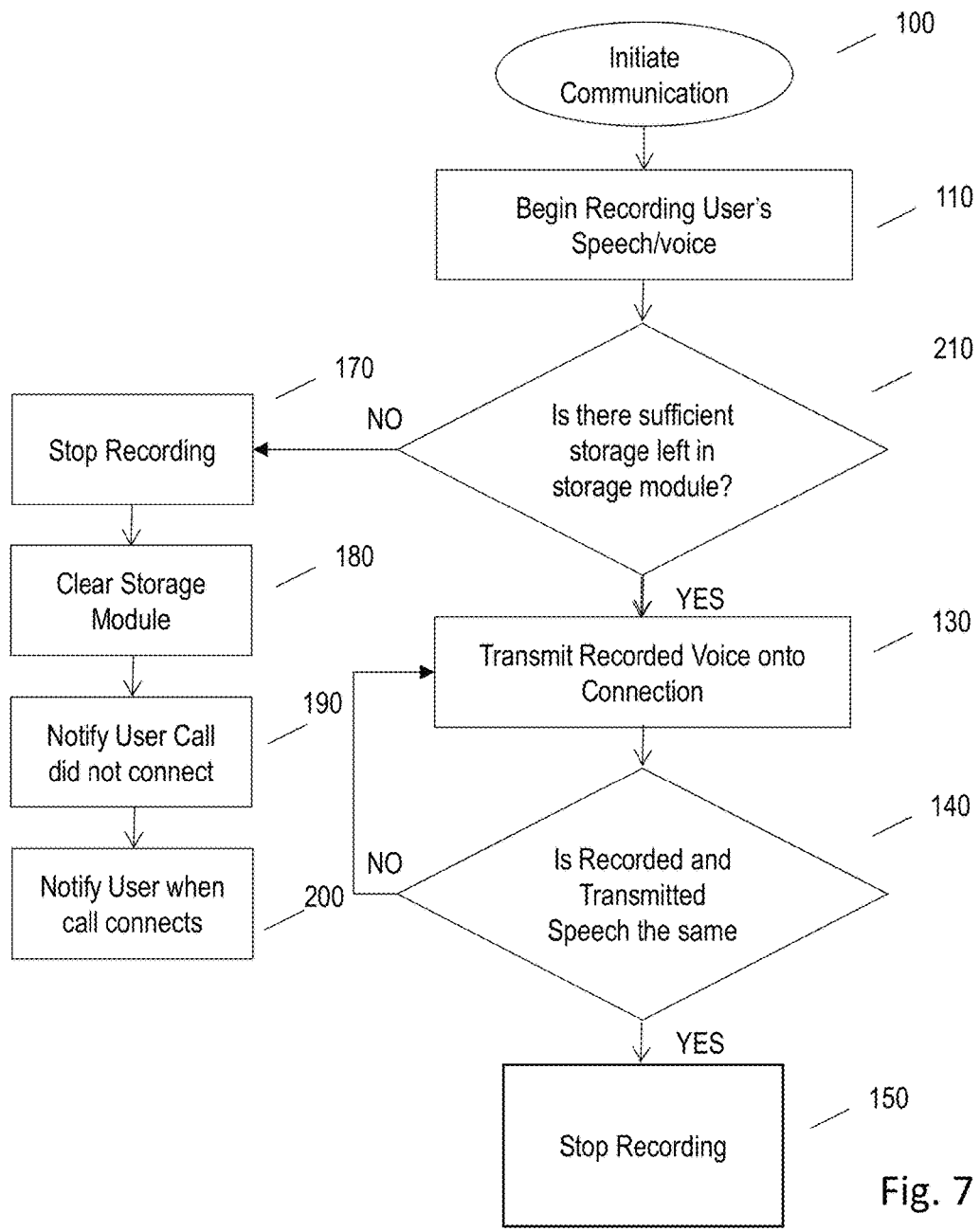

In one or more embodiments (e.g. FIGS. 6 and 7), the technology may be configured to stop recording 170 and clear the storage module 180 in the event that the call is not established within a predetermined time period 160 and/or if the remaining storage space in the storage module 50 reaches or falls below a predetermined threshold 210. If the storage module 50 is cleared 180 it is desirable for the user initiating the call to be notified that the call has not been established 190 and that the storage module 50 has been cleared 180 so that the user initiating the call does not continue speaking and can restarts the conversation when the call is eventually established. This also allows the call to fallback to traditional dial and wait for answer 200 and prevents the storage module from growing too large and becoming difficult to manage.

The system may also be configured with a call setup delay parameter that will be used to wait for a programmable time in seconds before sending the stored speech to the distant end. The speech is stored and played out in real-time continuously and the system sets a goal to minimize the stored audio speech to 0 seconds over time. This is accomplished by reducing the buffer being played from the stored audio dynamically based on speech detection and time scale reduction using methods such as synchronized overlap-add (SOLA). Once the stored audio buffer reaches 0 seconds then the conversation can be said to be back in real time.

If the distant end contact does not answer within a pre-defined period of time, the distant end system can optionally be configured to auto answer and store the user's speech in yet another storage system that can be played back by the distant end contact at that contact's convenience. For example, auto answer could be per user request, could be based on a time-out, could be a default setting, etc. Those skilled in the art will recognize that while not preferred, the user's speech may be maintained in the original voice cache 50 and when the distant end contact eventually connects to the line the speech could be played back over the communication line. The playback of the user's speech in storage can be transmitted at a faster rate than recorded in order to reduce the time. This allows a user to immediately send speech to any contact or several contacts at the same time or at different times (depending upon when each contact connects to the respective communication channel). From the user's perspective he/she begins speaking immediately. From each distant end contact's perspective, they will hear the start of the speech (possibly at different times), but they too will think that the speech is immediate once they connect. The user does not have to wait for each connection to be established, nor for an automatic answering service such as voicemail, nor does the system have to keep all contacts in an active voice session all the time. This saves system resources, cost, and expands the capability of the system.

Having thus described preferred embodiments of the invention, advantages can be appreciated. Variations from the described embodiments exist without departing from the scope of the technology or the claims. Thus it is seen that systems and methods are provided for managing a number of persistent connections attributed to a user while managing other connections for that user as dynamic connections which appear to the user as persistent connections or sufficiently similar to persistent connections that the differences are immaterial. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A system for managing persistent voice channels, said system comprising:
    a plurality of persistent voice channels assigned to a user device;
    a monitor in communication with said plurality of persistent voice channels;
    said monitor configured to determine a set of said plurality of persistent voice channels that is utilized more often than another set of said plurality of persistent voice channels; and,
    a voice channel provisioning module configured to convert at least one persistent voice channel from said another set of said plurality of persistent voice channels into a dynamically provisioned voice channel.

2. The system according to claim 1 wherein said voice channel provisioning module is configured to convert all of said another set of said plurality of persistent voice channels into dynamically provisioned voice channels.

3. The system according to claim 2 wherein said voice channel provisioning module is further configured to convert all of said set of said plurality of persistent voice channels into dynamically provisioned voice channels.

4. The system according to claim 1 further comprising a storage module in electrical communication with said user device said storage module configured to store a user's voice when said user initiates a call on said at least one dynamically provisioned voice channel and to transmit said stored voice over said channel when said dynamically provisioned channel is established.

5. The system according to claim 3 wherein said storage module is configured to transmit said stored voice over said channel at a rate that is faster than a rate at which said voice is stored by said storage module.

6. The system according to claim 3 further comprising said storage module configured to continue storing and transmitting said user's voice until said voice being stored and said voice being transmitted are the same.

7. The system according to claim 5 wherein said rate of said voice transmission is determined dynamically based on a voice detection and time scale reduction.

8. A method for limiting an availability of persistent voice connections for a user, said method comprising:
    a server provisioning a plurality of persistent voice channels for a user device;
    a monitor determining a set of said plurality of persistent voice channels that is utilized more often than another set of said plurality of persistent voice channels; and,
    said sever converting at least one persistent voice channel from said another set of said plurality of persistent voice channels into a dynamically provisioned voice channel.

9. The method according to claim 8 further comprising said server converting all of said persistent voice channels from said another set of said plurality of persistent voice channels into dynamically provisioned voice channels.

10. The method according to claim 9 further comprising said server converting said set of said plurality of persistent voice channels that is utilized more often than said another set of said plurality of persistent voice channels into dynamically provisioned voice channels.

11. The method according to claim 8 further including a storage module storing a user's voice when said user initiates a call on said at least one dynamically provisioned voice channel and transmitting said stored voice over said channel when said dynamically provisioned channel is established.

12. The method according to claim 8 wherein said storage module transmits said stored voice over said dynamically provisioned channel at a faster rate than said storage device stores said voice in said storage module.

13. The method according to claim 12 wherein said storage module discontinues storing said voice once said voice transmission catches up to said voice storage.

14. The method according to claim 12 wherein said storage module dynamically determines the rate of transmission based on a voice detection and time scale reduction.

15. The method according to claim 8 further including a storage module storing a user's voice when said user initiates a call on said at least one dynamically provisioned voice channel and deleting said user's voice when said dynamically provisioned channel is not established within a predetermined period of time.

16. A method of creating a dynamically provisioned voice channel, said method comprising:
    assigning a persistent voice channel to a user device;
    converting the persistent voice channel into a dynamically provisioned voice channel;
    initiating, with a user device, a voice call on the dynamically provisioned voice channel;
    in response to said initiating said call, said user device recording to a storage module, which is associated with the user device, voice received by the user device from the user;
    said user device transmitting said recorded voice from said storage module onto said voice channel in response to said voice channel being established; and,
    said user device continuing to record said user's voice to said storage module and transmit said recorded voice from said storage module onto said voice channel until said voice being transmitted catches up to said voice being recorded.

17. The method according to claim 16 further including said user device recording said voice to said storage device at a slower rate than said user device transmits said recorded voice onto said voice channel.

18. The method according to claim 16 wherein said user device dynamically determines the rate of transmission from said storage module based on a voice detection and time scale reduction.

19. The method according to claim 18 wherein said user device employs synchronized overlap-add (SOLA) for said voice detection and time scale reduction.

20. The method according to claim 16 wherein said user device waits a predetermined period of time before transmitting said recorded voice from said storage module onto said voice channel.

21. The method according to claim 16 further including said user device retransmitting said recorded voice in response to detecting a failure of the voice channel.

* * * * *